(12) United States Patent
Branch et al.

(10) Patent No.: US 9,021,484 B2
(45) Date of Patent: Apr. 28, 2015

(54) MIGRATED APPLICATION PERFORMANCE COMPARISONS USING LOG MAPPING

(75) Inventors: Joel W. Branch, Hamden, CT (US); Amitkumar M. Paradkar, Mohegan Lake, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 13/528,994

(22) Filed: Jun. 21, 2012

(65) Prior Publication Data

US 2013/0346980 A1  Dec. 26, 2013

(51) Int. Cl.
*G06F 9/46* (2006.01)
*G06F 11/34* (2006.01)

(52) U.S. Cl.
CPC ........ *G06F 11/3428* (2013.01); *G06F 11/3476* (2013.01); *G06F 2201/865* (2013.01)

(58) Field of Classification Search
USPC ......................................................... 718/100
See application file for complete search history.

(56) References Cited

U.S. PATENT DOCUMENTS

| | | | |
|---|---|---|---|
| 7,089,536 B2 | 8/2006 | Ueki et al. | |
| 7,167,858 B2 * | 1/2007 | Naeymi-Rad et al. | ................. 1/1 |
| 7,437,359 B2 * | 10/2008 | Aguilar-Macias et al. | ........... 1/1 |
| 7,526,409 B2 | 4/2009 | Ramacher et al. | |
| 7,716,319 B2 | 5/2010 | Kataoka et al. | |
| 2009/0063395 A1 | 3/2009 | Klump et al. | |

OTHER PUBLICATIONS

Nagaraj et al., Structured Comparative Analysis of Systems Logs to Diagnose Performance Problems, 2011, Purdue e-Pubs, Purdue University Department of Computer Science Computer Science Technical Reports.*

* cited by examiner

*Primary Examiner* — Emerson Puente
*Assistant Examiner* — Steven Do
(74) *Attorney, Agent, or Firm* — Stephen J. Walder, Jr.; Louis J. Percello

(57) ABSTRACT

Mechanisms are provided for comparing the performance of applications. An application log record associated with a first application is identified. Mappings between the application logs and underlying log record of environments are made for both the source and the target environments. Performance measurements are made based on both the application logs in the source and target environments are made and compared to each other by way of the mappings. A result of the comparison is output to thereby compare performance of the first application in the source environment with performance of a second application in the target environment.

27 Claims, 5 Drawing Sheets

MIGRATED APPLICATION PERFORMANCE COMPARISONS USING LOG MAPPING

BACKGROUND

The present application relates generally to an improved data processing apparatus and method and more specifically to mechanisms for evaluating the performance of migrated applications by mapping logs of application performance both prior to and post migration.

SUMMARY

In one illustrative embodiment, a method, in a data processing system, is provided for comparing the performance of applications. The method comprises identifying at least one first application log record associated with a first application and having performance information of interest and performing a first mapping of the at least one first application log record to at least one alternative log record associated with events of an underlying first environment in which the first application is executed. The method further comprises performing a second mapping of the at least one alternative log record to at least one second application log record associated with a second application executing in an underlying second environment and generating first performance measurements of the first application based on the at least one first application log record. The method also comprises generating second performance measurements of the second application based on the at least one second application log record and comparing the first performance measurements and the second performance measurements based on the first mapping and the second mapping. The method further comprises outputting a result of the comparison to thereby compare performance of the first application in the first environment with performance of the second application in the second environment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
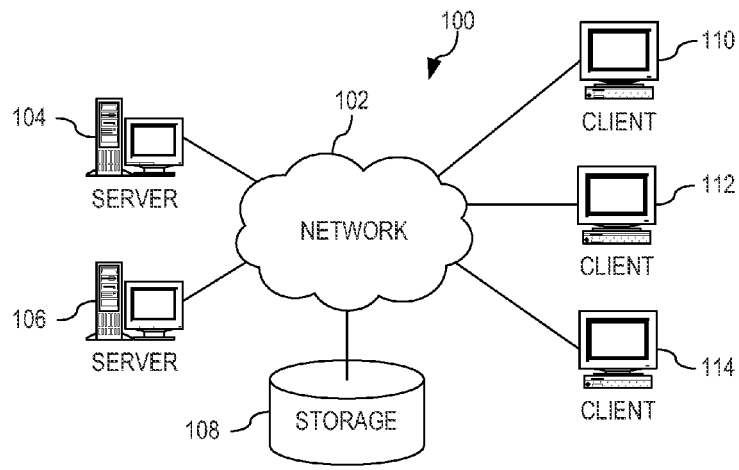
FIG. 1 is an example diagram of a distributed data processing system in which aspects of the illustrative embodiments may be implemented.

Migrating an information technology infrastructure between different environments often requires a performance baselining and comparison process. In such a case, the performance of one or more computer processes is analyzed in a pre-migration environment. The same process' performances are later analyzed in a post-migration environment and compared. One way of carrying out performance analysis and comparison is using time-stamped records in log data structures produced by the activities of a computer process. This way of performance analysis may be preferred since analyzing logs does not disrupt the activities of the process. However, one must know what types of records to obtain from such logs in order to be able to perform the performance analysis. The same records in log data structures associated with both pre- and post-migration environments should be used to perform such performance analysis in order for the performance comparison to be accurate. However, when a computer process is migrated to a new environment, the software implementing the process may in fact change, e.g., a new version or vendor of software is selected to perform the processes. Hence, the challenge is to identify log records in log data structures associated with the execution of the process in the new environment that "map" to the same type of log records in the log data structures generated by execution of the process in the old environment so that accurate performance analysis may be performed.

The illustrative embodiments provide a mechanism for computer process performance analysis between different information technology (IT) environments using a set of policies for mapping a set of log records in one IT environment to another set of records in another IT environment. More specifically, the invention uses an available alternate log source whose format will not, or is less likely, to change between environments and whose data is also associated with the computer process of interest. One might ask why this log source cannot be used directly for performance analysis in the first place. Many times in log-based performance analysis, there is a "preferred" log that a human can more easily analyze to understand how to interpret the performance of the process. These types of logs should be used in both pre- and post-migration settings as it may be harder to use another log whose data is not as easily interpretable by a human.

To summarize the general approach of the illustrative embodiments, log records from a preferred pre-migration log are mapped to log records of an alternate log in a pre-migration environment. Then, a mapping between alternate log records in pre- and post-migration environments is established. Finally, a mapping between the alternate log records and preferred records in the post-migration environment is established. This chain of mappings supports mapping the log records in the pre-migration environment to corresponding log records in a post-migration environment using the alternate log records to facilitate this mapping.

One advantage of this approach is that one can now use logs for performance baselining and analysis in scenarios of Information Technology (IT) infrastructure migrations, e.g., data center relocations, cloud computing migrations, and the like, while taking into account differences in log structures in the various IT environments from which, and to which, processes are migrated. Again, this provides a non-invasive approach to performance analysis, unlike the use of monitoring instrumentation, e.g., probes, agents, etc., that might require hard to obtain security credentials and themselves may impact the performance of the processes in the pre- and post-migration environments. Thus, with the mechanisms of the illustrative embodiments performance comparisons are facilitated to provide information as to differences in the performance, e.g., the relative improvement or reduction in performance, of a process when it is migrated from one IT environment to another.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
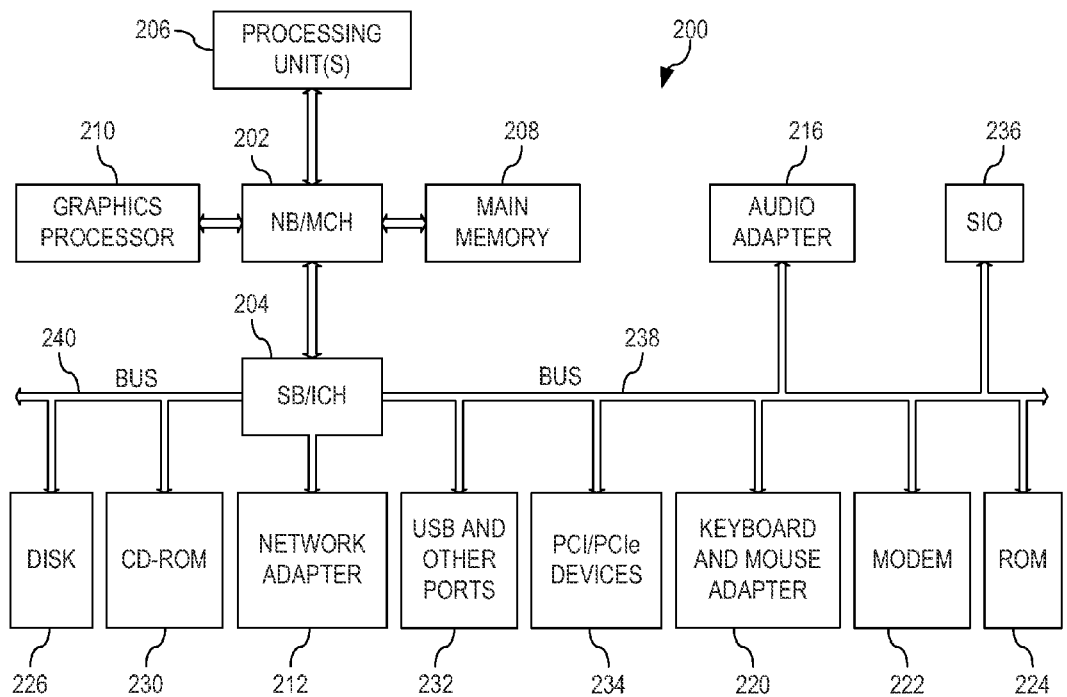
FIG. 2 is an example block diagram of a computing device in which aspects of the illustrative embodiments may be implemented.

The illustrative embodiments may be utilized in many different types of data processing environments including distributed data processing environments, stand alone computing device environments, and the like. However, since the present invention is directed to the mapping of log records between pre- and post-migration environments, it is especially well suited for use in a distributed data processing system, cloud computing system, or the like, in which a pre- and post-migration environment are provided. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As noted above, one of the problems associated with log-based performance baselining and comparison in order to identify changes is performance of processes when they are migrated from one operating environment, or IT environment, to another is that it may often be difficult to identify corresponding log records in the pre- and post-migration environments. That is, the processes may be transformed as part of the migration operation and, as a result, the log records generated in the pre- and post-migration environments may not directly match each other so that comparison is straight forward. For example, log record formats may change due to different software packages, versions, providers, or the like, facilitating the same transaction in the two different environments, i.e. pre- and post-migration environments.

Figure 3:
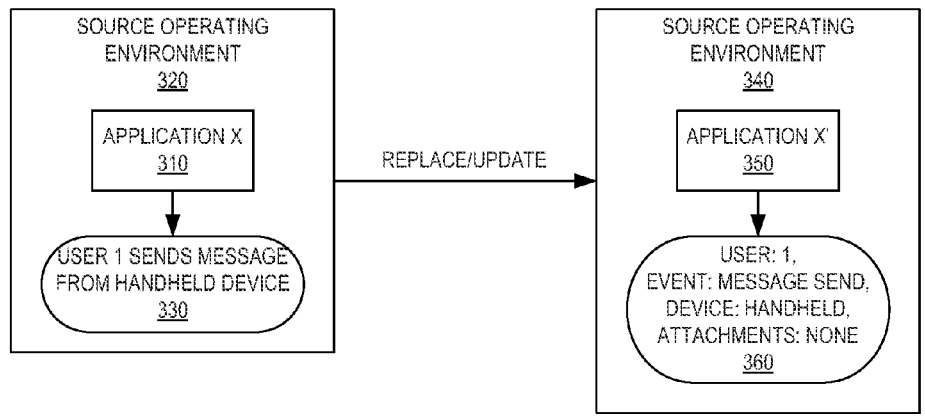
FIG. 3 illustrates the problems associated with log-based performance analysis of migrated processes that are addressed by the mechanisms of the illustrative embodiments.

FIG. 3 illustrates the problems associated with log-based performance analysis of migrated processes that are addressed by the mechanisms of the illustrative embodiments. As shown in FIG. 3, a first application 310 is deployed in a first operating environment 320 and handles various processes using the resources of the first operating environment 320. The operating environment 320 comprises the hardware and software resources for facilitating the execution of applications, such as first application 310, and performing other data processing operations. The first operating environment 320 may comprise hardware elements, such as processors, memories, storage systems, peripheral devices, hardware interfaces, buses, etc., as is generally known in the art. The first operating environment 320 may further comprise software elements such as an operating system, device drivers, applications, application programming interfaces (APIs), libraries, etc., as is generally known in the art.

Within the first environment 320, the first application 310 may operate to handle various operations performed within the first environment 320, such as servicing client requests and the like. For example, in the depicted example, the application 310 may operate to process messages sent from a handheld client communication device, such as a smart phone, personal digital assistant (PDA), portable hand-held computer or game machine, or the like. As a result of a user of a client computing device sending a message via the application 310, a log record for logging the operations performed by the application 310 to handle the sending of the message from the client computing device. For example, the log record 330 in the first environment 320 may be of the type "User 1 sends message from handheld."

At some point in time, the application 310 may need to be migrated to a new environment, such as the second environment 340. For example, the migration may be due to a need to offload the application 310 to another computing device and thus, the second environment 340, due to a need to upgrade the environment 320 to add additional hardware/software resources, or any of a number of reasons for a need to change the environment in which the application 310 operates.

As part of the migration of the application 310 from the first environment 320 to the second environment 340, the application 310 may need to be updated, replaced, or otherwise modified for proper operation within the second environment 340. The updated/replaced application 350 may be a different version of the application 310 or even a completely different software package that performs the same or similar functionality of the application 310 but in the second environment 340, for example. As a result of the updating/replacement of the application 310, the updated/replaced application 350 may perform the same functionality but may operate in a different manner and may be configured such that a different type of log record 360 is generated for the processes of the updated/replaced application 350. For example, for handling the very same sending of the message from the client computing device as handled by the application 310 in the first environment 320, a different log record 360 having a different log record format may be generated in the second environment 340 to log the operation of the updated/replaced application 350. As shown in FIG. 3, in one illustrative embodiment the log record 360 may have the format of "User:1, Event: message send, Device: handheld, Attachments: none."

In order to evaluate the change in performance, if any, of the application 310 when it is migrated to the new environment, i.e. the second environment 340, as replaced/updated application 350, the same logged operations in both environments 320 and 340 need to be able to be compared. However, as is evident from the example shown in FIG. 3, the formats and contents of the log records may make it so that it is not immediately recognizable which log records correspond to each other in these different environments 320 and 340; there is not a direct correlation of the formats of the log records and thus not a direct equivalence able to be identified. As a result, it may be difficult to perform a comparison of log records 330 and 360 in order to identify any differences in performance of the application 310 in the two environments 320 and 340.

The illustrative embodiments provide a mechanism for mapping the log record 330 in the first environment 320 to corresponding log records 360 in the second environment to which the application 310 is migrated. The illustrative embodiments provide an intermediate mapping mechanism for mapping the log record 330 in the first environment 320 to an alternate log record in the first environment 320, mapping the alternate log record in the first environment 320 to an alternate log record in the second environment 340 (which should be identical or significantly similar since the nature of the alternate log record format is that it seldom changes if at all between environments), and then mapping the alternate log record to the log record 360 of the second environment 340. Alternatively, the alternate log record in the first environment 320 may be used to map directly to the log record 360 in the second environment 340.

In this way, the performance information maintained in the log record 330 in the first environment 320 may be compared with the performance information in a corresponding log record 360 in the second environment 340 so as to facilitate determinations as to how performance has been modified by the migration of the application 310 from the first environment 320 to the second environment 340. Such performance information may include, for example, time and date-based properties, timestamp information, sequences of operations, and the like. Policies for correlating the log record 330 in the first environment 320 to one or more alternate log record representations, and correlating the one or more alternate log record representations to one or more corresponding log records 360 in the second environment 340, may be established to perform the matching of log records for comparison of performance information.

Figure 4:
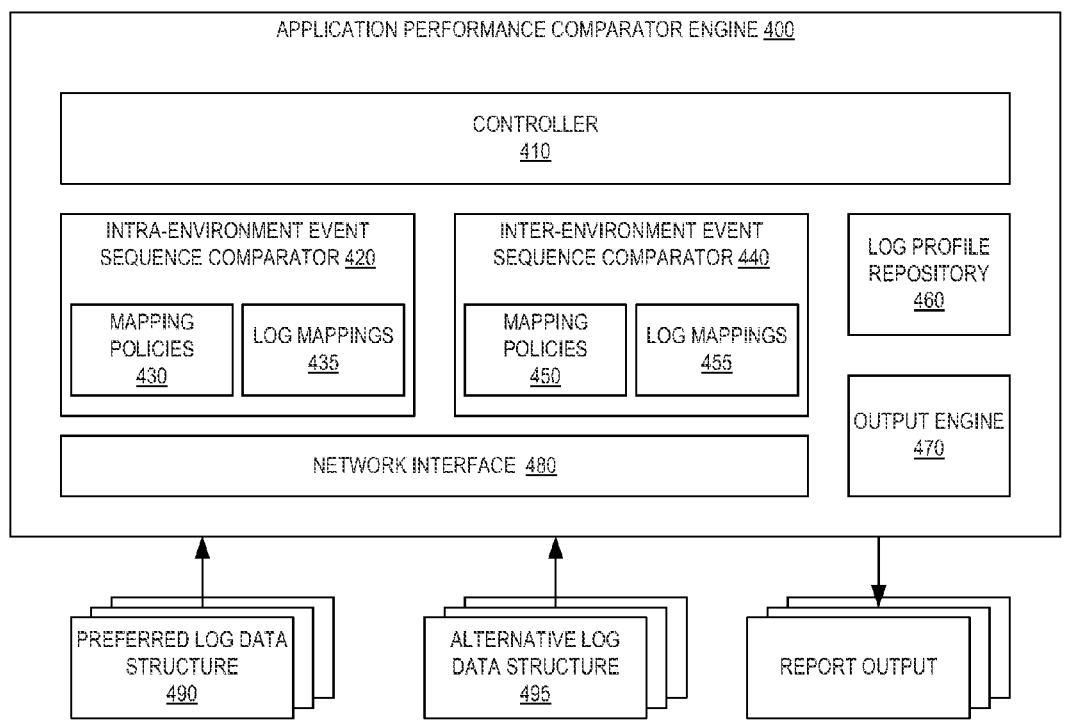
FIG. 4 is an example block diagram illustrating the primary operational elements of an application performance comparator in accordance with one illustrative embodiment.

FIG. 4 is an example block diagram illustrating the primary operational elements of an application performance comparator in accordance with one illustrative embodiment. The elements shown in FIG. 4 may be implemented in hardware, software, or any combination of hardware and software. For example, in one illustrative embodiment, the elements shown in FIG. 4 may be implemented as software instructions, stored in one or more memories or other type of computer readable storage mediums, which are then executed on one or more processors of one or more data processing systems.

As shown in FIG. 4, the application performance comparator engine 400 comprises a controller 410, an intra-environment event sequence comparator 420, an intra-environment log mapping policies repository 430, intra-environment log mapping data structure 435, an inter-environment event sequence comparator 440, inter-environment log mapping policies repository 450, inter-environment log mapping data structure 455, log profile repository 460, an output engine 470, and a network interface 480. These elements of the application performance comparator engine 400 receive as inputs the preferred log data structures 490 and alternate log data structures 495 of the various environments for which performance comparisons of an application are to be performed. The application performance comparator engine 400 may generate various outputs, e.g., data structures, visual outputs on display devices, electronic communications such as electronic mail messages, instant messages, or the like, etc., indicating changes or differences in performance of an application, processes within an application, or other processes of interest within the various environments, based on the operation of the comparators 420 and 440 operating on the log records in the log data structures 490 and 495.

The preferred log data structures 490 are log data structures in a "preferred" format which is to mean that they are in a format for use by end users, such as system administrators or the like. The "preferred" format is a more user friendly and user readable format than other machine based formats for logging, as previously discussed above. The preferred log data structures 490 may comprise logs from applications, middleware, web server logs, database logs, business process execution software logs, and the like.

The controller 410 controls the overall operation of the application performance comparator engine 400 and orchestrates the operation of the other elements. The network interface 480 provides a mechanism for communicating with other computing devices, storage devices, or the like, via one or more data networks, such as for obtaining access to log data structures, providing outputs of performance calculations or performance comparisons, or the like.

The intra-environment event sequence comparator 420 performs probabilistic mapping of event sequences from a preferred log data structure 490 to event sequences of an alternate log data structure 495 within the same IT environment, e.g., within a pre-migration environment (hereafter referred to as the "source" environment). That is, within the source environment, at least two different types of log data structures are generated and maintained. The first log data structure is a preferred log data structure 490 which stores log records representing events generated by the operation of processes within an application, middleware, or the like, executing within the source environment. The second log data structure is an alternate log data structure 495 which stores log records representing events generated by the IT environment, e.g., the source environment, as the application is executing within the source environment. Such alternate log data structure 495 events may include, for example, OS/kernel events, database events, network/socket events, and other events of the underlying environment other than the events generated by the application processes directly, e.g., events that occur as a result of supporting the processes of the application executing in the source environment. The nature of the alternate log data structure record format is that it should not change between pre- and post-migration environments or such changes should be relatively infrequent such that the alternate log data structure record format can be considered essentially the same in both the pre- and post-migration environments, i.e. the source environment and the target environment.

To further illustrate the different types of log data structures, consider a networked Java application. In such an example, communication events may be logged by the author of the application in the Java application. Such events may be logged in the preferred log data structure 490. The Java Virtual Machine (JVM) may also log certain events since it supplies libraries to support the communication processes the author built into the Java application. The actual operating system might also log certain communication events that are being executed by the JVM. The events associated with the JVM may be stored in the alternative log data structure 495.

As another example, consider a situation in which an author creates application x, e.g., a stock purchasing application, which depends on application y, e.g., a government regulated middleware/service to execute trades. The author's software generates preferred logs that are stored in the preferred log data structure 490. The regulated middleware/service generates the alternate log data structures 495.

The intra-environment event sequence comparator 420, based on established mapping policies in the intra-environment log mapping policies repository 430, maps events, or sequences of events, in the preferred log data structure 490 to corresponding events, or sequences of events, in the alternate log data structure 495. As one example, a mapping policy may take the form of specifying that a high frequency, i.e. above a predefined threshold value, of events sharing the same timestamp or timestamp values within a predefined window of time in both the preferred log data structure 490 and the alternate log data structure 495 may be considered to map to each other. Thus, for example, if a first event A, or pattern of events A, in the preferred log data structure 490 has a timestamp that is within a predefined window of time of a timestamp associated with a second event B, or pattern of events B, in the alternate log data structure 495, then according to the mapping policy, these events A and B, or patterns of events A and B, may be correlated as mapping to one another. This correlation may be maintained in an intra-environment mapping data structure 435 to specify that event A, or pattern of events A, maps to event B, or pattern of events B.

As another example, the mapping policy may take the form of specifying that a high frequency of patterns of events occurring in the same sequence with similar temporal distributions among events may be determined to be related to each other. For example, the mapping policy may specify a pattern of application X is defined as ({a, b, c}, f(a, b), f(b, c)), where {.} is the sequence of events a, b, c and f(.) is a function defining statistics of time intervals between two events, e.g., a and b, b and c, etc. If the same pattern of events occur repeatedly and have a same temporal relationship with another pattern of events, then the two patterns of events may be considered related such that a mapping between the two patterns may be established and stored in the intra-environment mapping data structure 435.

The intra-environment event sequence comparator 420 may utilize probability functions to determine if a first event, or pattern of events, in the preferred log data structure 490 correlates to a second event, or pattern of events, in the alternate log data structure 495. For example, a mapping probability may be defined as a function of one or more of the mapping policies described above. For example, a probability function p(a, b)=f(freq(diff(timestamp_a, timestamp_b)<=different_threshold), where a and b are events in different logs, diff(.) is a difference function, and freq(.) measures the frequency of which differences in a timestamp associated with event a and a timestamp associated with event b do not exceed a threshold value different_threshold. As another example, a probability function p(sequence_x, sequence_y)=f([p(sequence_x_1, sequence_y_1)+p(sequence_x_2, sequence_y_2)+ . . . +p(sequence_x_n, sequence_y_n]/n, diff(temporal_distr(sequence_x), temporal_distr(sequence_y))), where sequence_x_i is the ith event of sequence_x, diff(.) is some difference function, temporal_distr(.) represents some distribution of difference of adjacent event timestamps in a sequence.

The probabilities indicate the probability that event a correlates to event b, or sequence x correlates to sequence y. Based on these probabilities, the mapping of events or sequences of events in the log data structures 490 and 495 may be determined and stored in the intra-environment mapping data structure 435. For example, a probability threshold may be predetermined against which the probabilities are compared. If the probability meets or exceeds this probability threshold, then a correlation between events and/or sequences of events is determined to exist and may be used to generate a mapping rule.

The intra-environment event sequence comparator 430 may perform the mapping between events in preferred log data structures 490 and alternate log data structures 495 for a plurality of pairs of preferred log data structures 490 and alternate log data structures 495. Thus, for example, a mapping between events in a preferred log data structure 490 and a corresponding alternate log data structure 495 in a source environment, and another mapping between events in a preferred log data structure 490 and a corresponding alternate log data structure 495 for a target environment may be generated.

A similar functionality is performed by the inter-environment event sequence comparator 440. However, the inter-environment event sequence comparator 440 operates to map events, or sequences of events, in an alternate log data structure 495 of one environment, e.g., a source environment, to events, or sequences of events, in an alternate log data structure 495 of a second environment, e.g., target environment. The mappings between alternate log data structures 495 of the various environments may be stored in the inter-environment log mapping data structure 455. As mentioned above, it is desirable that the records in the alternate log data structure 495 have a format that does not vary often between environments. As a result, the mapping between one alternate log data structure 495 of one environment and that of another environment should, for the most part, be a straight mapping. However, since there may be some discrepancies between the underlying environment resources that support the execution of the applications in the environment such that there may be some differences in format of the log records in the alternate log data structure 495, the additional inter-environment log mapping data structure 455 may be provided to facilitate the mapping. However, if it is known that both the source environment (environment from which an application is being migrated) and target environment (environment to which the application is migrated) utilize the same alternate log record format, then a direct mapping between the alternate log data structure 495 of the source environment to the preferred log data structure 490 of the target environment may be utilized.

The generation of the mappings stored in the inter-environment log mapping data structure 455 may be performed in a similar manner as discussed above with regard to the intra-environment log mapping data structure 435. That is, mapping policies and probability functions may be defined for determining mappings between log records.

As an additional operation, the system may choose to compare keywords belonging to records of different environments to make a decision as to whether to map the records or not. Consider the case where the aforementioned policies are used to calculate a mapping probability, but it doesn't "quite" meet the threshold value. As an additional operation, the system might take those records in question and see if they contain, for example, 70% of the same words. Alternatively, the system might look for a high percentage of occurrences of "key" or pre-defined special words between the records. In a simple case, the probability would simply be the percentage of matching words, and if this probability crosses a threshold, then the system will establish the mapping. The general idea is that records sharing highly similar content probably represent the same event.

The log profile repository 460 stores rules for identifying log records that can be used for performance analysis purposes. For example, a rule may define a regular expression, or similar type of pattern, that describes a log record of interest. Thus, when analyzing the preferred log data structure of an environment for log records indicative of performance information for evaluating performance, the log profile repository 460 may be used to match expressions, patterns, or other values determined to be indicative of performance information. These log records having been identified may then be analyzed to determine the performance characteristics of a corresponding application within the selected environment. The same can be done for the application in other environments in which the application is deployed. Using the mechanisms of the illustrative embodiments, the mapping of log records from application log records to alternate log records within the same IT environment, and then from one alternate log record to another between IT environments, and finally from the alternate log record in the other IT environment to the application log record in the other IT environment, permits a comparison of performance information for the application in two different environments. This may be extrapolated to any number of different environments.

Figure 5:
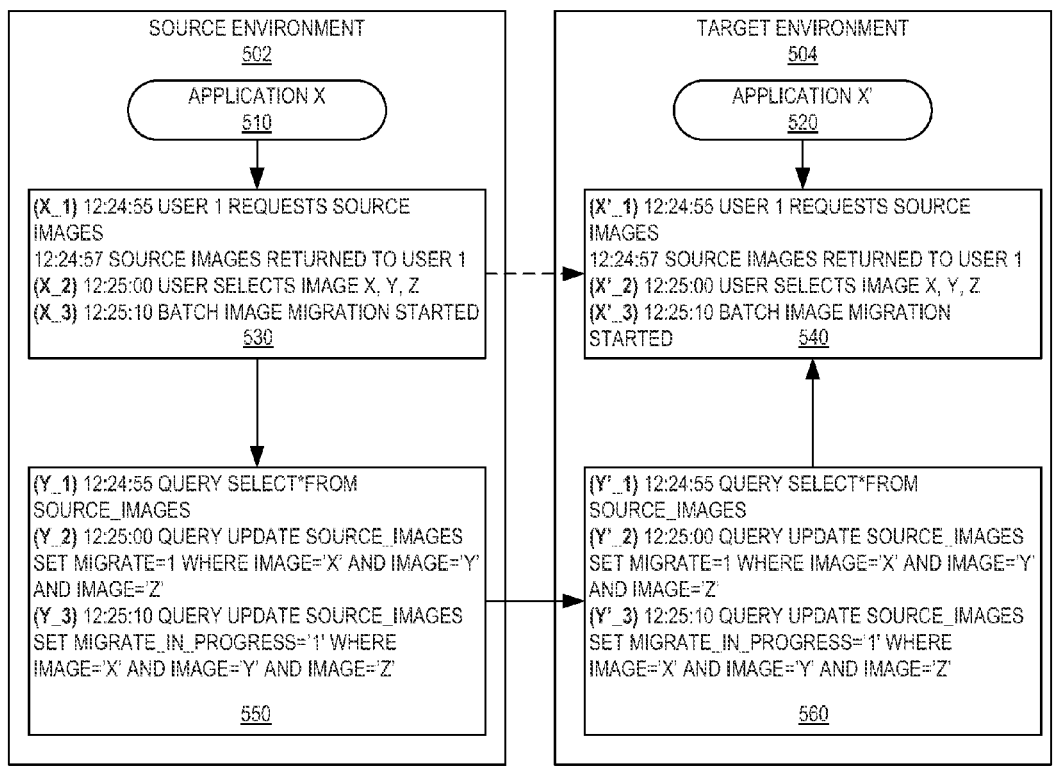
FIG. 5 illustrates the performance comparisons done using the mechanisms of the illustrative embodiments to map a pattern of log records in a preferred log data structure of an application in a first environment to a pattern of log records in a preferred log data structure of an application in a second environment.

FIG. 5 illustrates the performance comparisons done using the mechanisms of the illustrative embodiments to map a pattern of log records in a preferred log data structure of an application in a first environment to a pattern of log records in a preferred log data structure of an application in a second environment. In the depicted example, it is assumed that the application 510 in the first environment (or "source" environment) 502 is functionally equivalent to the application 520 in the second environment (or "target" environment) 504 even though the application code itself may be modified to accommodate the different environments. That is, in one scenario, the application 510 in the source environment 502 is migrated to the target environment 504 and in the process of the migration, some modifications to the application 510 may need to be made to cause the application 510 to function properly in the target environment 504, thereby causing application 520 to be generated. As a result, the log records in preferred log data structure 540 of the migrated application 520 in the target environment 504 may be different from the log records in the preferred log data structure 530 of the application 510 in the source environment 502 even though these log records may be ultimately directed to similar processes in both applications 510 and 520. Thus, it may be difficult to correlate log records in these two environments for comparison of performance information with regard to similar processes in the applications 510 and 520.

With reference again to FIG. 4, and with continued reference to FIG. 5, with the mechanisms of the illustrative embodiments, the log profile repository 460 may be used to identify a log record, or pattern of log records, in the log record data structure 530 of the source environment 502 that contains information useful in determining one or more performance characteristics of the application 510 in the source environment 502. As a result, in the depicted example, the pattern of log records $x\_1$, $x\_2$, and $x\_3$ are identified in the preferred log data structure 530 as having performance information. The calculation of one or more performance characteristics for the operation of the application 510 in the source environment 502 may then be calculated based on the information in the identified pattern of log records $x\_1$, $x\_2$, and $x\_3$, such as an amount of time required to service a client request for obtaining an image from an image database.

In addition, using the mechanisms of the illustrative embodiments, the identified pattern of log records in the preferred log data structure 530 may be mapped to a corresponding pattern of log records in an alternative log data structure 550 associated with the source environment 502. That is, a mapping of the pattern of log records in the preferred log data structure 530 to a corresponding pattern of log records in the alternate log data structure 550 may be already maintained by the application performance comparator engine 400 and thus, the correlation can be made using the existing mappings. If a mapping does not exist for this pattern of log records (one or more log records), then the mechanisms of the intra-environment event sequence comparator 420 of FIG. 4 may be utilized to generate the mapping based on mapping policies and probability functions as described above.

Similarly, the application performance comparator engine 400 may map the log records in the alternate log data structure 550, which themselves map to the identified pattern of log records in the preferred log data structure 530, to log records in the alternate log data structure 560 in the target environment 504. As noted above, in many cases, the format of log records in the alternate log data structure 550 is the same as the format of log records in the alternate log data structure 560 and thus, the mapping is simple. This is because the alternate log data structures 550 and 560 store log records for portions of their respective environments 502 and 504 that are common between the environments or do not change often of by much over time. However, in some cases, a mapping data structure may be maintained for defining the mappings between alternate log data structure records.

At this point, the identified log record pattern in the preferred log data structure 530 has been mapped to log records in the alternate log data structure 560 of the target environment 504. Having established this mapping, in order to be able to compare the performance of the application 510 in the source environment 502 to the migrated application 520 performance in the target environment 504, a mapping from the alternate log data structure records of the alternate log data structure 560 to corresponding log records in the preferred log data structure 540 is utilized. This mapping may be already established and stored in the application performance comparator 400 or may be generated by the intra-environment event sequence comparator 420 using the mapping policies and probability functions described above.

In this way, a mapping from the identified log records in the preferred log data structure 530 and the preferred log data structure 540 is established. Performance calculations may likewise be performed on the corresponding log records in the preferred log data structure 540 and thus, the performance of the application 510, as determined from the log records of the preferred log data structure 530, may be compared to the performance of the migrated application 520, as determined from the log records of the preferred log data structure 540 that correspond (map) to the log records of the preferred log data structure 530 as determined by the mappings to the alternate log data structures 550 and 560. That is, the mappings made possible by the mechanisms of the illustrative embodiments map the pattern of log records $x\_1$, $x\_2$, and $x\_3$ in the preferred log data structure 530 to the alternate log records $y\_1$, $y\_2$, and $y\_3$ in the alternate log data structure 550. The alternate log records $y\_1$, $y\_2$, and $y\_3$ in the alternate log data structure 550 are mapped to alternate log records $y'\_2$, and $y'\_3$ in the alternate log data structure 560 of the target environment 504 (if such a mapping is necessary and the alternate log data structures 550 and 560 are not known to utilize the same log record format). Thereafter, the alternate log records $y'\_1$, $y'\_2$, and $y'\_3$ are mapped to the log records $x'\_2$, $x'\_3$ in the preferred log data structure 540 of the target environment 504. As a result, the performance of the application 510 in the source environment 502, as determined from analysis of information in log records $x\_1$, $x\_2$, and $x\_3$, may be compared to the performance of the migrated application 520 in the target environment 504, as determined from analysis of information in log records $x'\_1$, $x'\_2$, and $x'\_3$ in the preferred log data structure 530.

The results of this performance comparison between the application 510 in the source environment 502 and the migrated application 520 in the target environment 504 may be used as a basis for generating one or more performance reports by the output engine 470. The output engine 470 may generate an output, such as a display, a data structure, an electronic message, or the like, that indicates the difference (if any) in performance between the application 510 and the migrated application 520. The output generated by the output engine 470 may be transmitted to a computing device, storage device, or the like, via the network interface 480, for example. In this way, the mechanisms of the illustrative embodiments facilitate the comparison of performance of applications between computing or IT environments.

It should be noted that while the illustrative embodiments are described herein as being applicable to the migration of an application from one environment to another, the illustrative embodiments are not limited to such. For example, the mechanisms of the illustrative embodiments may be used to compare the performance of an application to any other application. Thus, the applications need not be so related as to be the original application and a migrated version of the same application. Furthermore, the illustrative embodiments may even be utilized to compare the performance of two different applications within the same environment by mapping the log records associated with these different applications to similar underlying environment log records in the alternative log data structure.

Figure 6:
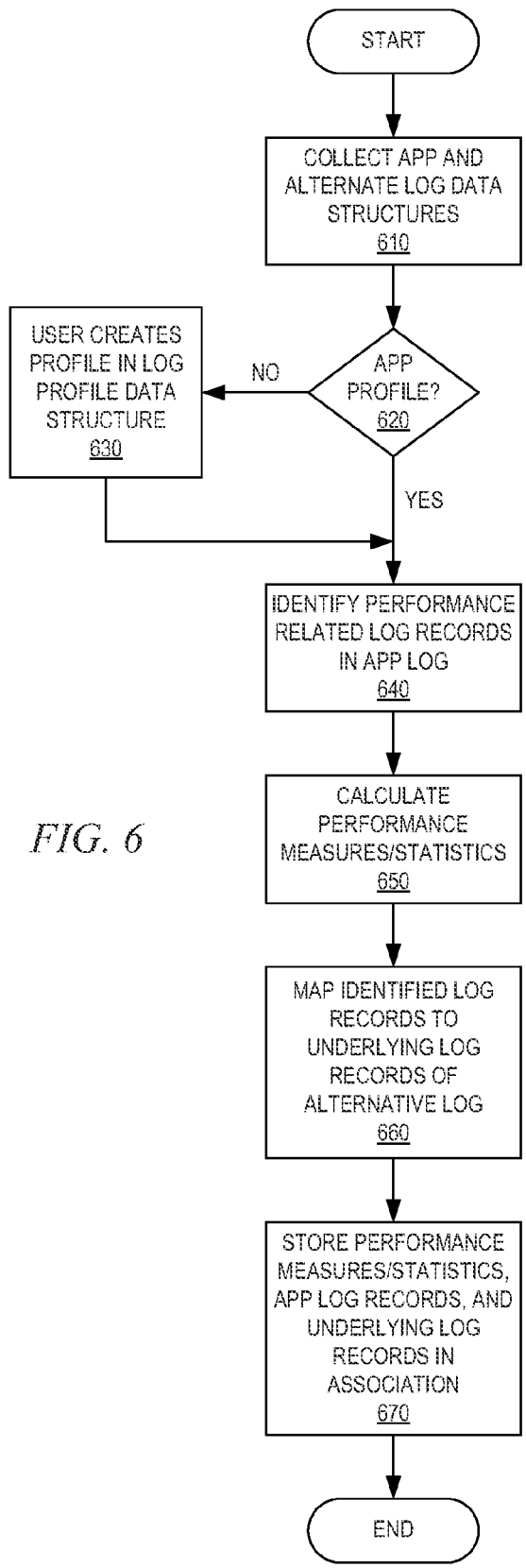
FIG. 6 is a flowchart outlining an example operation for intra-environment log record mappings and performance measurement in accordance with one illustrative embodiment.

FIG. 6 is a flowchart outlining an example operation for intra-environment log record mappings and performance measurement in accordance with one illustrative embodiment. The operations outlined in FIG. 6 may be performed, for example, by the application performance comparator engine 400 of FIG. 4, for example.

As shown in FIG. 6, the operation starts by collecting application and alternate log data structures for the particular environment (step 610). A determination is made as to whether an application profile is available in the log profile repository to identify those log records of interest for performance measurements (step 620). If not, then a user is prompted to create a new profile and update the log profile repository to identify the types of log records that are of interest for performance measurement purposes (step 630). After the user creates the appropriate profile in the log profile repository, or if one already exists, the performance related log records in the preferred log data structure are identified based on the log profile for the application in question (step 640). Performance measurements or statistics for the identified log records in the preferred log data structure are calculated/obtained (step 650). The mapping policies and probability functions are used to identify underlying log events in the alternate log data structure that correspond with the performance related log records in the preferred log data structure (step 660). The performance measurements or statistics, and corresponding application and underlying log records associated with these performance measurements or statistics are then stored in association with each other (step 670). The operation then ends.

Figure 7:
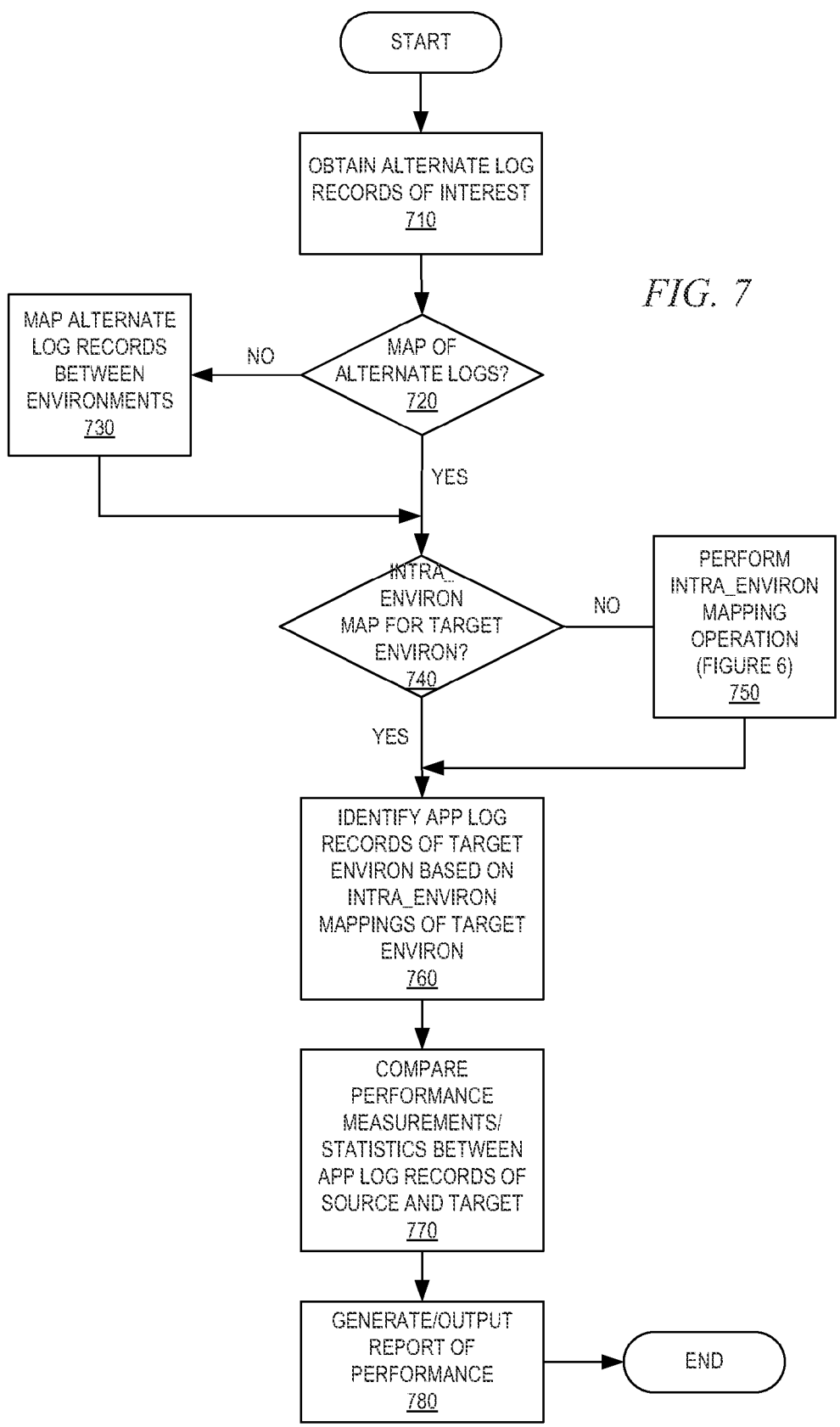
FIG. 7 is an example flowchart outlining an example operation for inter-environment log record mappings and performance measurement in accordance with one illustrative embodiment.

FIG. 7 is an example flowchart outlining an example operation for inter-environment log record mappings and performance measurement in accordance with one illustrative embodiment. The operation outlined in FIG. 7 may also be performed by the application performance comparator engine 400 in FIG. 4, for example.

As shown in FIG. 7, the operation starts by obtaining the alternate log records of interest after having performed the intra-environment mapping in the manner described in FIG. 6 above (step 710). A determination is made as to whether a mapping between the alternative log data structure of the source environment and an alternative log data structure of the target environment is present or needed (step 720). If so, then the alternate log records are mapped from the alternative log data structure of the source environment to the alternative log data structure of the target environment (step 730). Thereafter, or if no mapping is required, then a determination is made as to whether a mapping between the alternative log records of the target environment and application log records of a preferred log data structure of the target environment exists (step 740). If not, then the intra-environment mapping operation outlined in FIG. 6 may be performed to obtain the intra-environment mapping between the alternative log records and the application log records of the target environment as well as corresponding performance measurements or statistics (step 750).

Thereafter, or if the intra-environment mapping already exists, the mapping is used to identify the application log records and their associated performance measurements or statistics corresponding to the alternative log records of the target environment, which in turn correspond to the alternative log records of the source environment, and ultimately the application log records of interest in the source environment (step 760). A comparison between the performance measurements or statistics associated with the application log records in the source environment and the performance measurements or statistics associated with the application log records in the target environment is then performed and performance difference results are generated (step 770). These performance differences may then be used to generate a report for output and use in determining a difference in the performance of an application in the source environment and an application in the target environment (step 780). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for comparing the performance of applications, comprising:
   identifying at least one first application log record associated with a first application and having performance information of interest;
   performing a first mapping of the at least one first application log record to at least one alternative log record associated with events of an underlying first environment in which the first application is executed, based on at least one mapping policy of at least one log mapping policies repository;

performing a second mapping of the at least one alternative log record to at least one second application log record associated with a second application executing in an underlying second environment, based on the at least one mapping policy of the at least one log mapping policies repository;

generating first performance measurements of the first application based on the at least one first application log record;

generating second performance measurements of the second application based on the at least one second application log record;

comparing the first performance measurements and the second performance measurements based on the first mapping and the second mapping; and outputting a result of the comparison to thereby compare performance of the first application in the first environment with performance of the second application in the second environment.

2. The method of claim 1, wherein performing the first mapping comprises mapping a first application log record to a first alternate log record in a first alternate log data structure, and wherein performing the second mapping comprises mapping the first alternate log record in the first alternate log data structure to a second alternate log record in a second alternate log data structure.

3. The method of claim 2, wherein the first alternate log record has at least one of a different format or a different content than the second alternate log.

4. The method of claim 1, wherein the first environment is an original environment from which the first application is extracted, and wherein the second environment is a new environment to which the first application is deployed and is implemented as the second application.

5. The method of claim 4, wherein the first application has a different implementation from the second application but performs a similar functionality.

6. The method of claim 1, wherein the at least one first application log record is associated with at least one event generated by a process of the first application executing in the first environment, and wherein the at least one alternate log record is associated with at least one event generated by the first environment, the at least one event generated by the first environment corresponding to the at least one event generated by the process of the first application executing in the first environment.

7. The method of claim 6, wherein the at least one second application log record is associated with at least one event generated by a process of the second application executing in the second environment, and wherein the at least one alternate log record is associated with at least one event generated by the second environment, the at least one event generated by the second environment corresponding to the at least one event generated by the process of the second application executing in the second environment.

8. The method of claim 1, wherein performing the first mapping comprises using a probabilistic calculation to determine a probability that a first application log record corresponds to an alternate log record in the at least one alternate log record, and generating a first mapping rule that maps the first application log record to the alternate log record in response to the probability being equal to or greater than a threshold probability value.

9. The method of claim 8, wherein performing the second mapping comprises using a probabilistic calculation to determine a probability that the alternate log record corresponds to a second application log record in the at least one second application log record, and generating a second mapping rule that maps the alternate log record to the second application log record in response to the probability being equal to or greater than a threshold probability value.

10. The method of claim 9, further comprising:
generating a third mapping rule to map the first application log record to the second application log record based on the first mapping rule and second mapping rule.

11. The method of claim 8, wherein the probabilistic calculation comprises using the probability function:

$$p(a,b)=f(\text{freq}(\text{diff}(\text{timestamp}\_a,\text{timestamp}\_b)<=\text{different\_threshold}),$$

where a and b are events in different logs, diff(.) is a difference function, and freq(.) measures a frequency of which differences in a timestamp associated with event a and a timestamp associated with event b do not exceed a threshold value different_threshold.

12. The method of claim 2, wherein performing the second mapping comprises using a first probabilistic calculation to determine a first probability that the first alternate log record corresponds to the second alternate log record and using a second probabilistic calculation to determine a second probability that the second alternate log record corresponds to the second log record.

13. A computer program product comprising a non-transitory computer readable medium having a computer readable program stored therein, wherein the computer readable program, when executed on a computing device, causes the computing device to:

identity at least one first application log record associated with a first application and having performance information of interest;

perform a first mapping of the at least one first application log record to at least one alternative log record associated with events of an underlying first environment in which the first application is executed, based on at least one mapping policy of at least one log mapping policies repository;

perform a second mapping of the at least one alternative log record to at least one second application log record associated with a second application executing in an underlying second environment, based on at least one mapping policy of at least one log mapping policies repository;

generate first performance measurements of the first application based on the at least one first application log record;

generate second performance measurements of the second application based on the at least one second application log record;

compare the first performance measurements and the second performance measurements based on the first mapping and the second mapping; and output a result of the comparison to thereby compare performance of the first application in the first environment with performance of the second application in the second environment.

14. The computer program product of claim 13, wherein the computer readable program causes the computing device to perform the first mapping by mapping a first application log record to a first alternate log record in a first alternate log data structure, and wherein performing the second mapping comprises mapping the first alternate log record in the first alternate log data structure to a second alternate log record in a second alternate log data structure.

15. The computer program product of claim 14, wherein the first alternate log record has at least one of a different format or a different content than the second alternate log.

16. The computer program product of claim 13, wherein the first environment is an original environment from which the first application is extracted, and wherein the second environment is a new environment to which the first application is deployed and is implemented as the second application.

17. The computer program product of claim 16, wherein the first application has a different implementation from the second application but performs a similar functionality.

18. The computer program product of claim 13, wherein the at least one first application log record is associated with at least one event generated by a process of the first application executing in the first environment, and wherein the at least one alternate log record is associated with at least one event generated by the first environment, the at least one event generated by the first environment corresponding to the at least one event generated by the process of the first application executing in the first environment.

19. The computer program product of claim 18, wherein the at least one second application log record is associated with at least one event generated by a process of the second application executing in the second environment, and wherein the at least one alternate log record is associated with at least one event generated by the second environment, the at least one event generated by the second environment corresponding to the at least one event generated by the process of the second application executing in the second environment.

20. The computer program product of claim 13, wherein the computer readable program causes the computing device to perform the first mapping by using a probabilistic calculation to determine a probability that a first application log record corresponds to an alternate log record in the at least one alternate log record, and generating a first mapping rule that maps the first application log record to the alternate log record in response to the probability being equal to or greater than a threshold probability value.

21. The computer program product of claim 20, wherein the computer readable program causes the computing device to perform the second mapping by using a probabilistic calculation to determine a probability that the alternate log record corresponds to a second application log record in the at least one second application log record, and generating a second mapping rule that maps the alternate log record to the second application log record in response to the probability being equal to or greater than a threshold probability value.

22. The computer program product of claim 21, wherein the computer readable program further causes the computing device to:
generate a third mapping rule to map the first application log record to the second application log record based on the first mapping rule and second mapping rule.

23. The computer program product of claim 20, wherein the probabilistic calculation comprises using the probability function:

$$p(a,b)=f(\text{freq}(\text{diff}(\text{timestamp}\_a,\text{timestamp}\_b)<=\text{different\_threshold}),$$

where a and b are events in different logs, diff(.) is a difference function, and freq(.) measures a frequency of which differences in a timestamp associated with event a and a timestamp associated with event b do not exceed a threshold value different_threshold.

24. The computer program product of claim 14, wherein the computer readable program causes the computing device to perform the second mapping by using a first probabilistic calculation to determine a first probability that the first alternate log record corresponds to the second alternate log record and using a second probabilistic calculation to determine a second probability that the second alternate log record corresponds to the second log record.

25. An apparatus, comprising:
a processor; and
a memory coupled to the processor, wherein the memory comprises instructions which, when executed by the processor, cause the processor to:
identify at least one first application log record associated with a first application and having performance information of interest;
perform a first mapping of the at least one first application log record to at least one alternative log record associated with events of an underlying first environment in which the first application is executed, based on at least one mapping policy of at least one log mapping policies repository;
perform a second mapping of the at least one alternative log record to at least one second application log record associated with a second application executing in an underlying second environment, based on at least one mapping policy of at least one log mapping policies repository;
generate first performance measurements of the first application based on the at least one first application log record;
generate second performance measurements of the second application based on the at least one second application log record;
compare the first performance measurements and the second performance measurements based on the first mapping and the second mapping; and
output a result of the comparison to thereby compare performance of the first application in the first environment with performance of the second application in the second environment.

26. The method of claim 1, wherein:
the first environment is a pre-migration information technology environment in which the first application executes;
the second environment is a post-migration information technology environment to which the first application is migrated with the first application being implemented as the second application executing in the second environment;
the at least one second application log record stores a same information as the at least one first application log record but in a different format from the at least one first application log record such that there is not a direct equivalence between the format of the at least one first application log record and the at least one second application log record; and
the comparison of the first performance measurements and the second performance measurements generates an indicator of a change in performance of the first application due to migration of the first application from the pre-migration information technology environment to the post-migration information technology environment.

27. The method of claim 26, wherein a format of the at least one alternative log record is the same in both the pre-migration information technology environment and the post-migration information technology environment.

\* \* \* \* \*